United States Patent
Wiesemann (10) Patent No.: US 6,669,854 B1
(45) Date of Patent: *Dec. 30, 2003

(54) STEPPING SCREEN ASSEMBLY HYDRAULICALLY DRIVEN

(75) Inventor: Bruce O. Wiesemann, Largo, FL (US)

(73) Assignee: Hydro-Dyne Engineering, Inc., Clearwater, FL (US)

( * ) Notice: Subject to any disclaimer, the term of this patent is extended or adjusted under 35 U.S.C. 154(b) by 60 days.

This patent is subject to a terminal disclaimer.

(21) Appl. No.: 10/053,825

(22) Filed: Jan. 22, 2002

(51) Int. Cl.[7] ............................................. B01D 33/01
(52) U.S. Cl. ..................... 210/780; 210/791; 210/155; 210/158; 210/159; 210/357; 210/389
(58) Field of Search ................................ 210/155, 158, 210/159, 388, 389, 391, 457, 357, 780, 791

(56) References Cited

U.S. PATENT DOCUMENTS

| | | | |
|---|---|---|---|
| 1,773,576 A | * 8/1930 | Downes | ...................... 210/388 |
| 4,521,305 A | 6/1985 | Deal | |
| 4,853,116 A | 8/1989 | Wallander | |
| 5,032,262 A | * 7/1991 | Wallander | .................... 210/155 |
| 5,098,561 A | * 3/1992 | Grabbe | ......................... 210/155 |
| 5,456,826 A | * 10/1995 | Mellegard | ................... 210/158 |
| 5,618,415 A | 4/1997 | Johnson, Jr. | |
| 5,770,055 A | * 6/1998 | Wallander et al. | ........... 210/159 |
| 6,139,728 A | * 10/2000 | Huber | .......................... 210/155 |
| 6,177,020 B1 | 1/2001 | Wiesemann | |
| 6,231,757 B1 | * 5/2001 | Huber | .......................... 210/158 |
| 6,245,225 B1 | * 6/2001 | Giersberg | ................... 210/155 |

* cited by examiner

Primary Examiner—Christopher Upton
(74) Attorney, Agent, or Firm—Larson & Larson, PA; James E. Larson (57) ABSTRACT

A stepping screen assembly bottom portion is located in a liquid waste stream containing solids. The assembly contains a grid structure containing dynamic and static bars horizontally spaced apart. An outer frame on one side of the grid structure contains a pair of hydraulic cylinders operating rods which move the dynamic grid structure outwardly, upwardly, backwardly and downwardly to cause the solids to be lifted from the liquid waste stream for deposit on a conveyor.

8 Claims, 14 Drawing Sheets

STEPPING SCREEN ASSEMBLY HYDRAULICALLY DRIVEN

FIELD OF THE INVENTION

This invention relates to a screen assembly for collecting and discharging solid matter from a liquid-solid mixture in a waste stream. More particularly, it refers to a hydraulic drive assembly containing a stepping screen for lifting solids out of a waste water stream and depositing them in a solids repository.

BACKGROUND OF THE INVENTION

It is well known in the prior art as shown in U.S. Pat. No. 4,853,116 to use a driving motor with an associated gear box propelling a pair of chains to move a grid structure upwardly and thereby lift solids out a liquid-solid mixture in a waste stream. Saw teeth are formed on combinations of displaceable bars and stationary bars to prevent the displaceable bars from becoming blocked. Such a system, while accomplishing its intended purpose, is cumbersome and unusually complex resulting in a high cost assembly of components. A more efficient and cost effective system is needed.

SUMMARY OF THE INVENTION

The present invention overcomes the deficiencies of the assembly described in U.S. Pat. No. 4,853,116 and provides an efficient cost effective means of removing solids from a liquid waste stream.

The invention is directed to an assembly of a grid structure surrounded by an outer frame with the assembly bottom portion located in a liquid waste stream containing solids. The grid structure includes multiple parallel alternate static and dynamic bars. Each bar has multiple vertically spaced apart shelves at a right angle to the vertical axis of the bar.

The dynamic bars have multiple spacers located on each side surface to space the dynamic bars from the static bars and support the horizontal displacement of the bars.

The outer frame on each side of the grid structure contains a pair of hydraulic cylinders connected to the dynamic bars by a shaft and mounting plate. One hydraulic cylinder of each pair causes the dynamic bars to move in a vertical plane and the other hydraulic cylinder of each pair causes the dynamic bars to move in a horizontal plane as dictated by a preprogrammed hydraulic system.

The grid structure moves solid material upwards and over the top of the grid structure to fall by gravity onto a conveyor for delivery of the solids to a waste receptacle. The liquid moves through the grid structure without impediment.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Throughout the following detailed description, the same reference numbers refer to the same elements in all figures.

Figure 1:
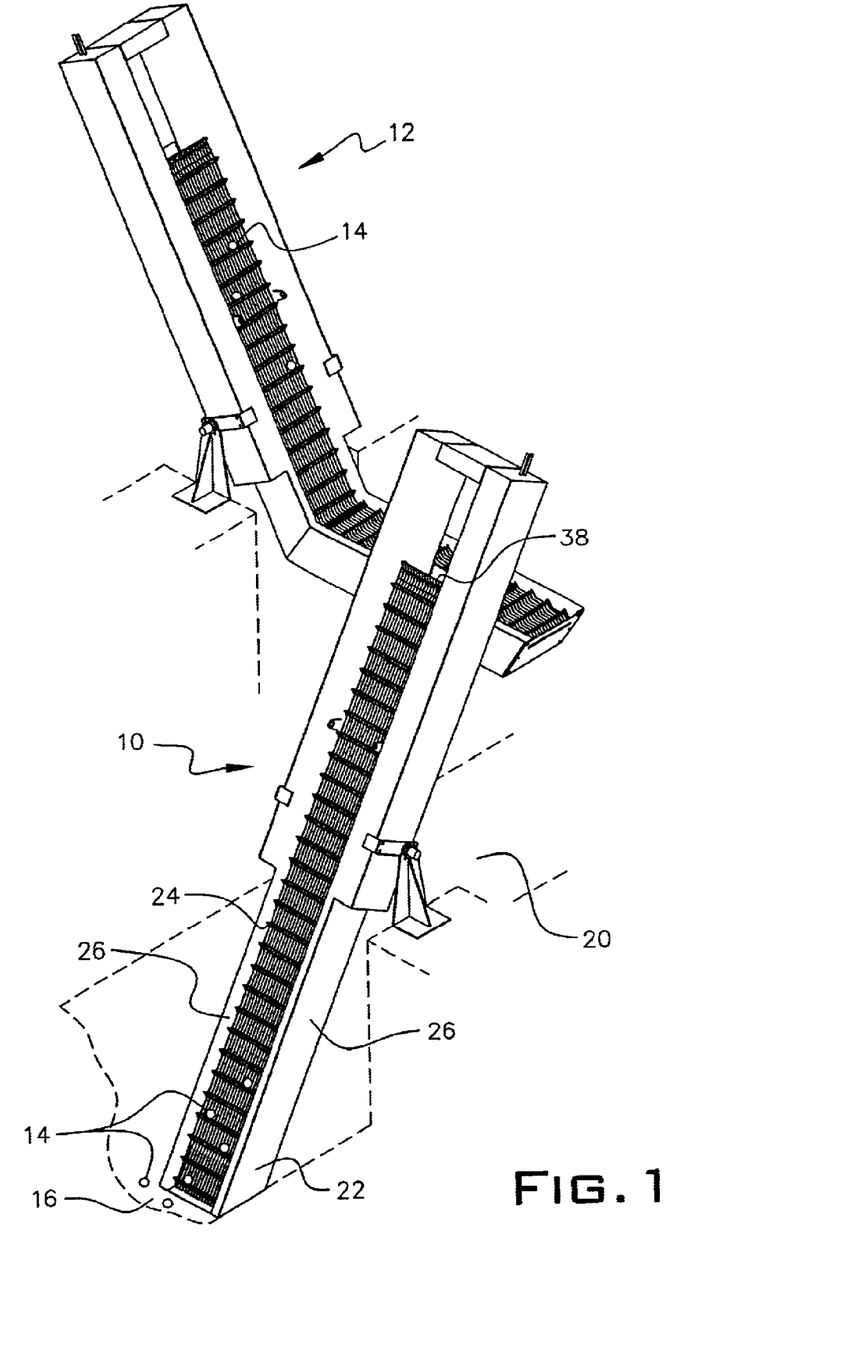
FIG. 1 is a perspective view of the stepping screen assembly of this invention and a conveyor belt.

The stepping screen assembly 10 shown in FIG. 1, together with a conveyer assembly 12 lifts solid matter 14 from a waste water stream 16 and eventually deposits the solid matter in a waste repository. Waste water 20 free of solid matter 14 proceeds through the stepping screen without impediment. Only the bottom portion 22 of the stepping screen assembly 10 is immersed in the waste water stream 16.

The stepping screen assembly 10 as shown in FIG. 1 is upwardly inclined and contains a grid structure 24 surrounded by an outer frame 26. The grid structure 24 contains alternating static 28 and dynamic 30 elongated bars as shown in more detail in FIGS. 2–9.

Figure 12:
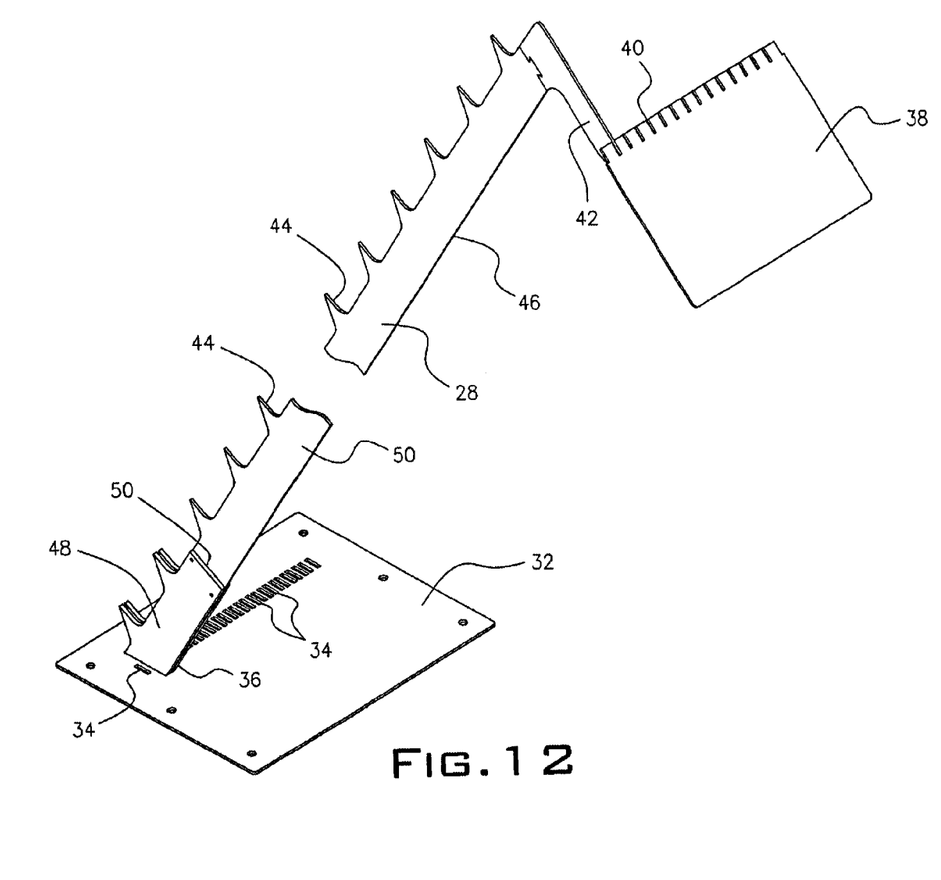
FIG. 12 is a perspective view of a static bar attached to top and bottom mounting plates.

The static bars 28 remain in a fixed position within the grid structure 24 and are mounted in relation to the dynamic bars 30 as shown in FIGS. 3, 5, 7 and 9. A bottom plate 32 has slots 34 into which a bottom end 36 of static bar 28 fits as seen in FIG. 12. Multiple shelves 44 at a right angle to the vertical axis of the static bar 28 are equally spaced apart along static bar 28 facing outwardly from a rear edge 46. A spacer 48 is mounted along an outer surface 50 above the bottom end 36 of a first static bar positioned at the outermost edge of the grid structure 24 at each side adjacent the outer frame 26. A top end portion 42 is attached in grooves 40 in the disposal plate 38.

The dynamic bars 30 shown in FIGS. 3, 5, 7 and 9 are driven by a pair of hydraulic pistons mounted on one side of the stepping screen 10 within an outer frame 26. A first hydraulic piston 52 causes connecting rod 54 to move hinged member 56 attached to shaft 58 connected to the dynamic grid to move the dynamic bars 30 in a front to back and reverse configuration. A second hydraulic piston 60 causes the shaft 58 to move up or down. A collar 62 connects to lower portion of the hinged member 56 to a shaft 58.

Hydraulic piston 52 is activated by a four way, two position valve 64 and hydraulic piston 60 is activated by a four way, two position valve 66. Oil line 68 carries oil from the oil reservoir (not shown) to the hydraulic system and oil line 70 carries the oil out of the system to the oil reservoir. Piston 52 is held in place by anchor 72 and piston 60 is held in place by anchor 74. Stops 76 and 78 respectively on control rod 80 instruct the valve 64 as to action of piston 60. Stops 82 and 84 respectively on control rod 86 instruct the valve 66 as to the action of piston 52. Bearings 88 guide the control rods 80 and 86.

Figure 2:
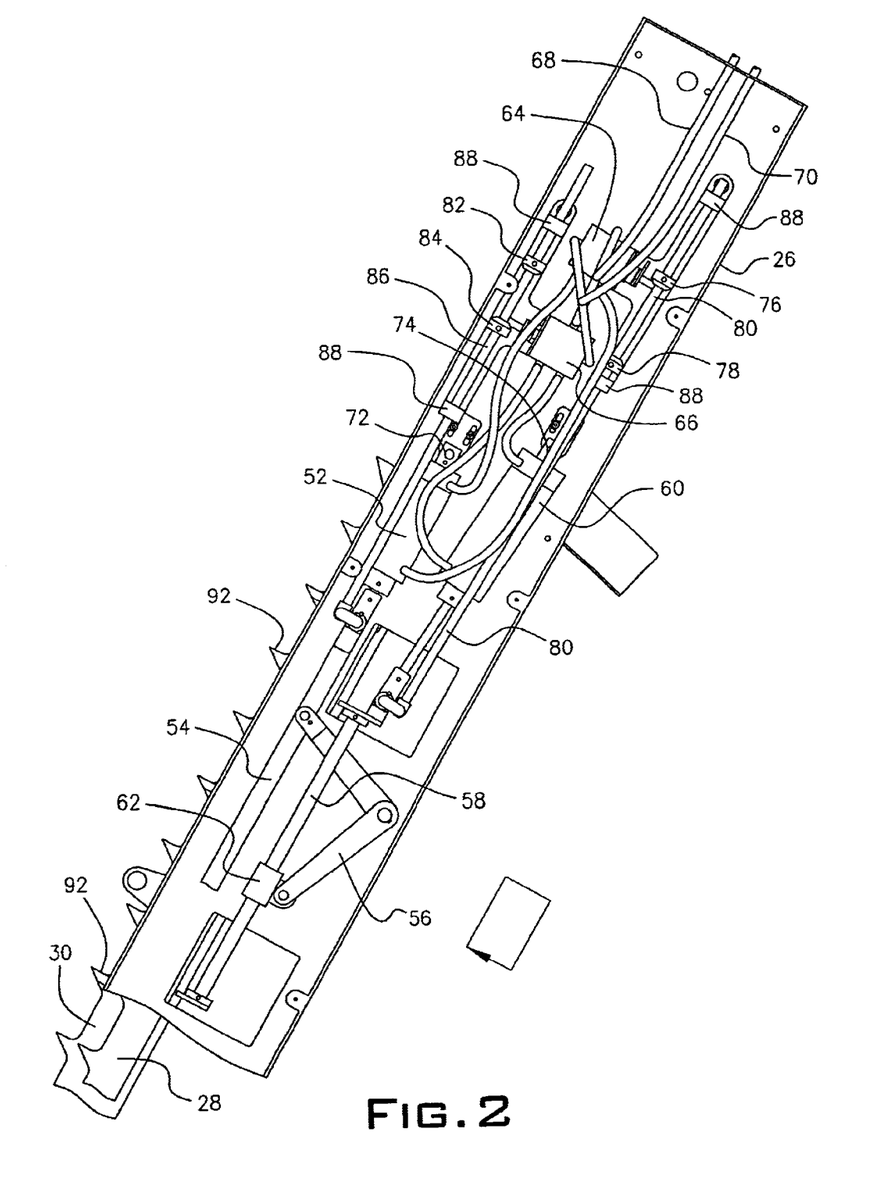
FIG. 2 is a cut-away elevational view of the assembly side frame containing the hydraulic piston driving mechanism depicting a home stage.
Figure 3:
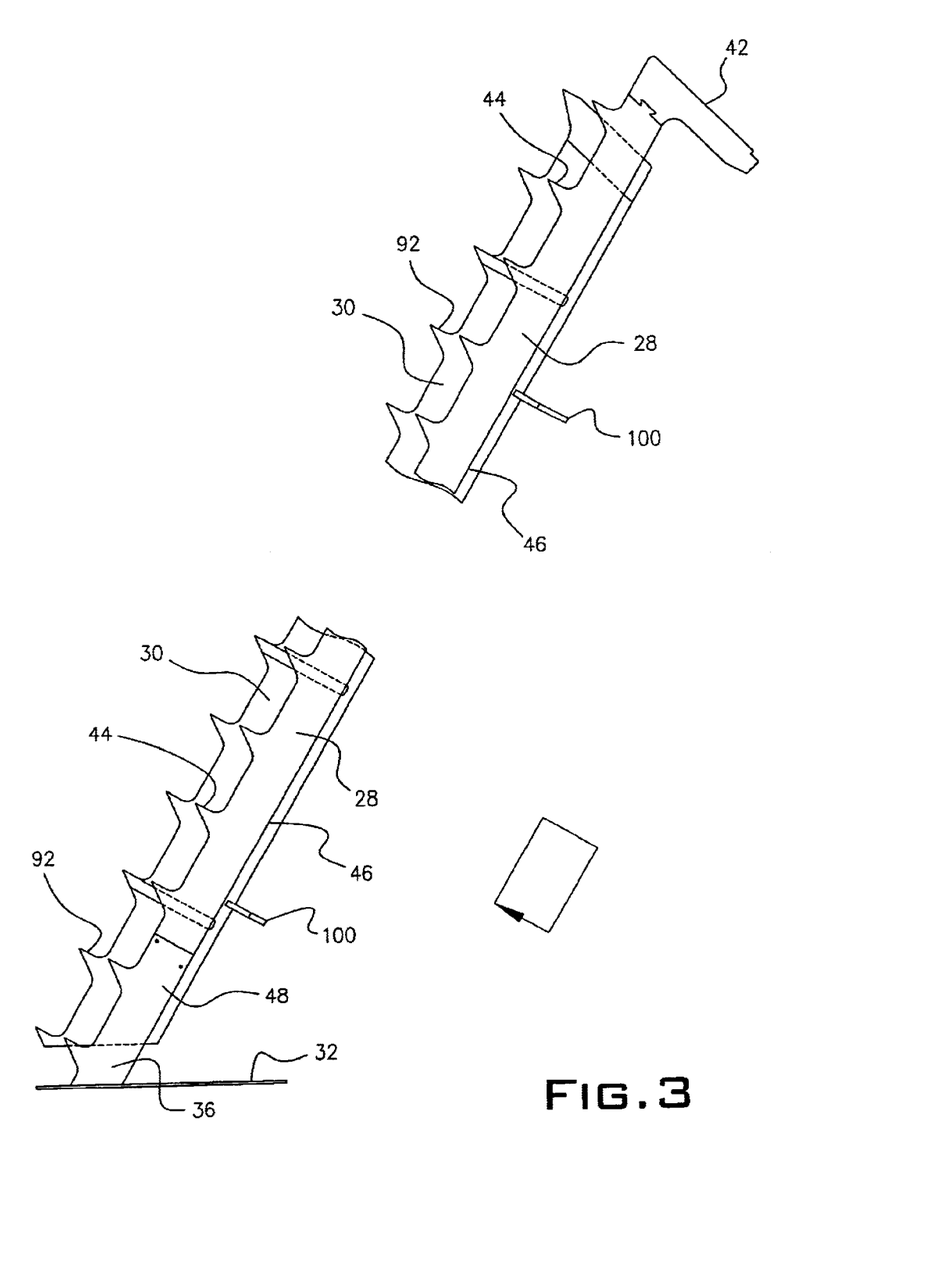
FIG. 3 is a cut-away elevational view according to FIG. 2 depicting movement of the dynamic bars outwardly with respect to the static bars.
Figure 4:
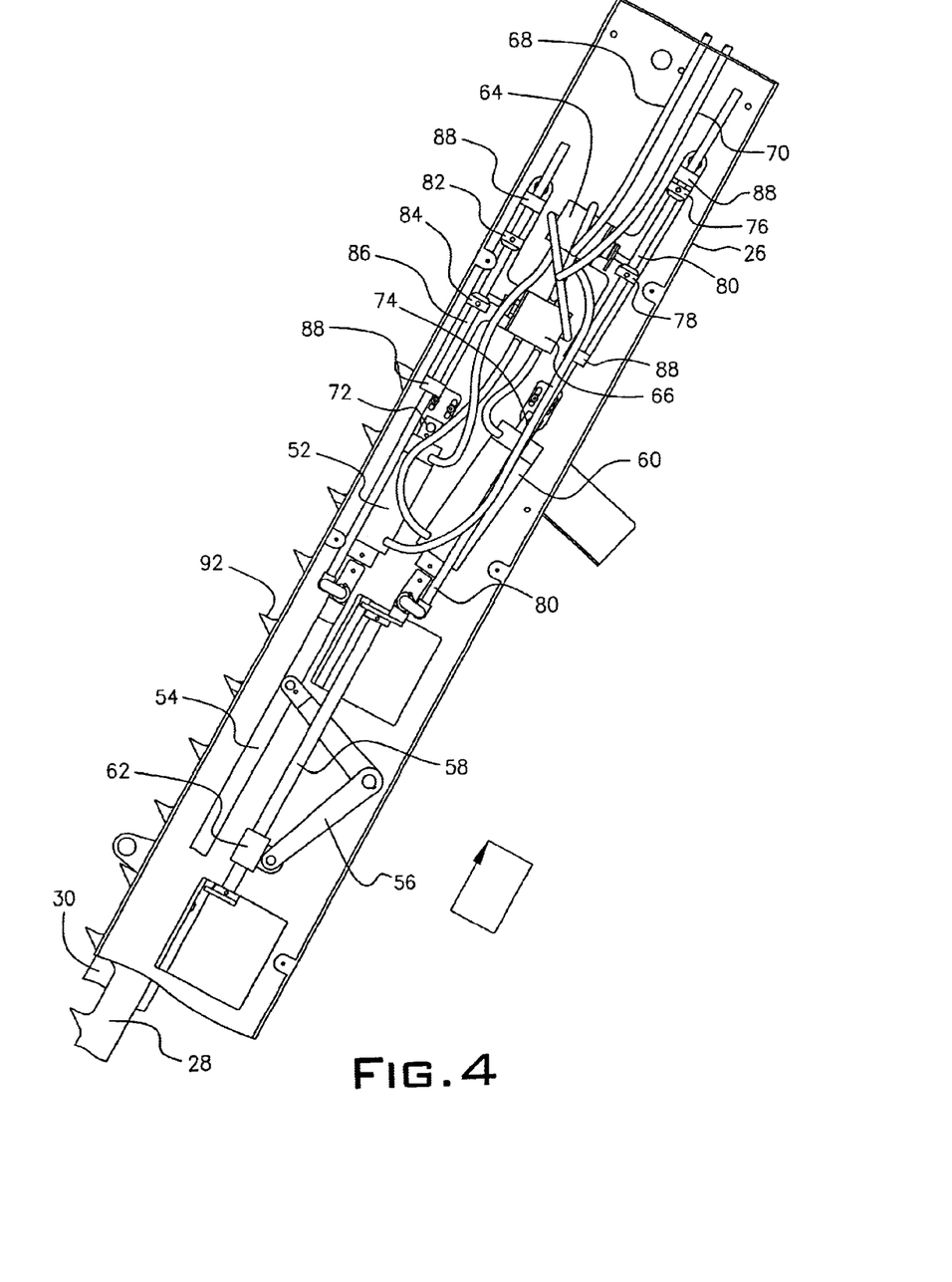
FIG. 4 is a cut-away elevational view of the assembly side frame containing the hydraulic piston driving mechanism depicting a dynamic bar moved upwardly to raise solid matter.
Figure 5:
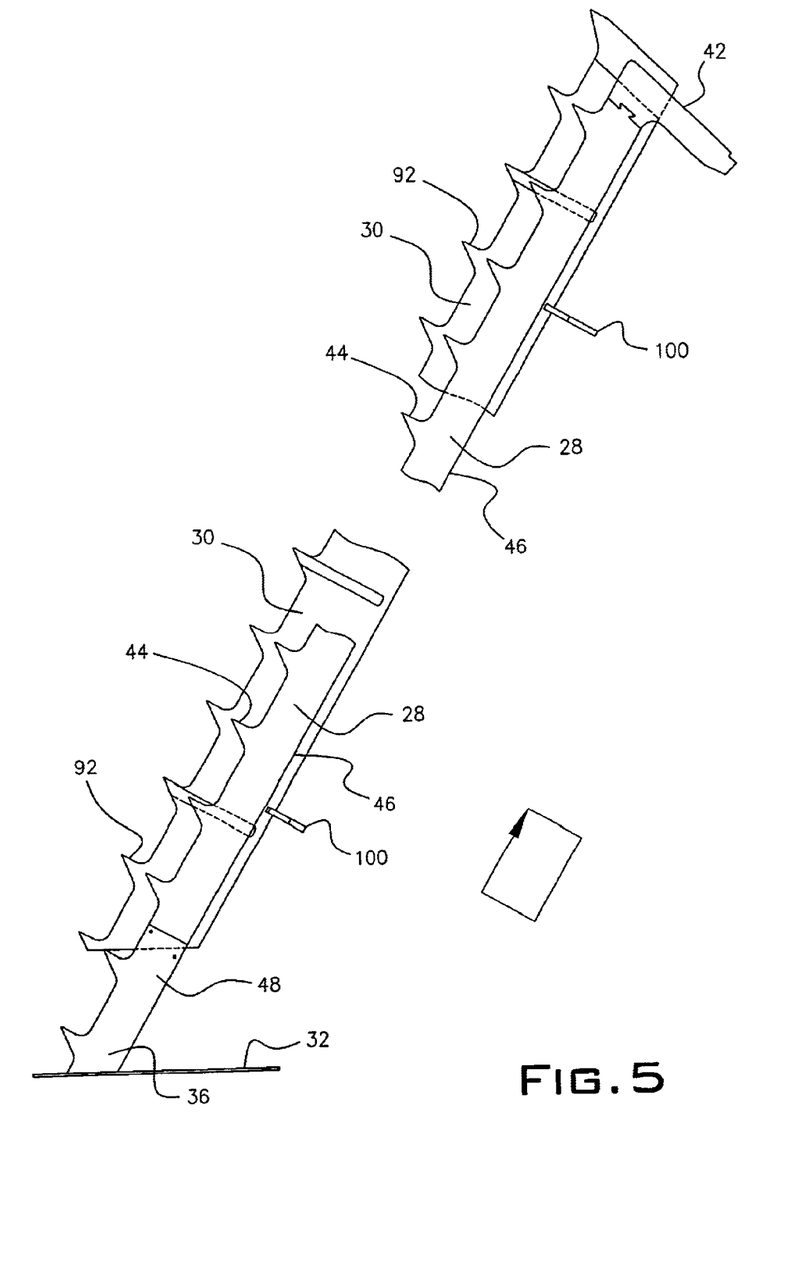
FIG. 5 is a cut-away elevational view according to FIG. 4 with the driving mechanism depicting movement of the dynamic bars upwardly to raise solid matter.
Figure 6:
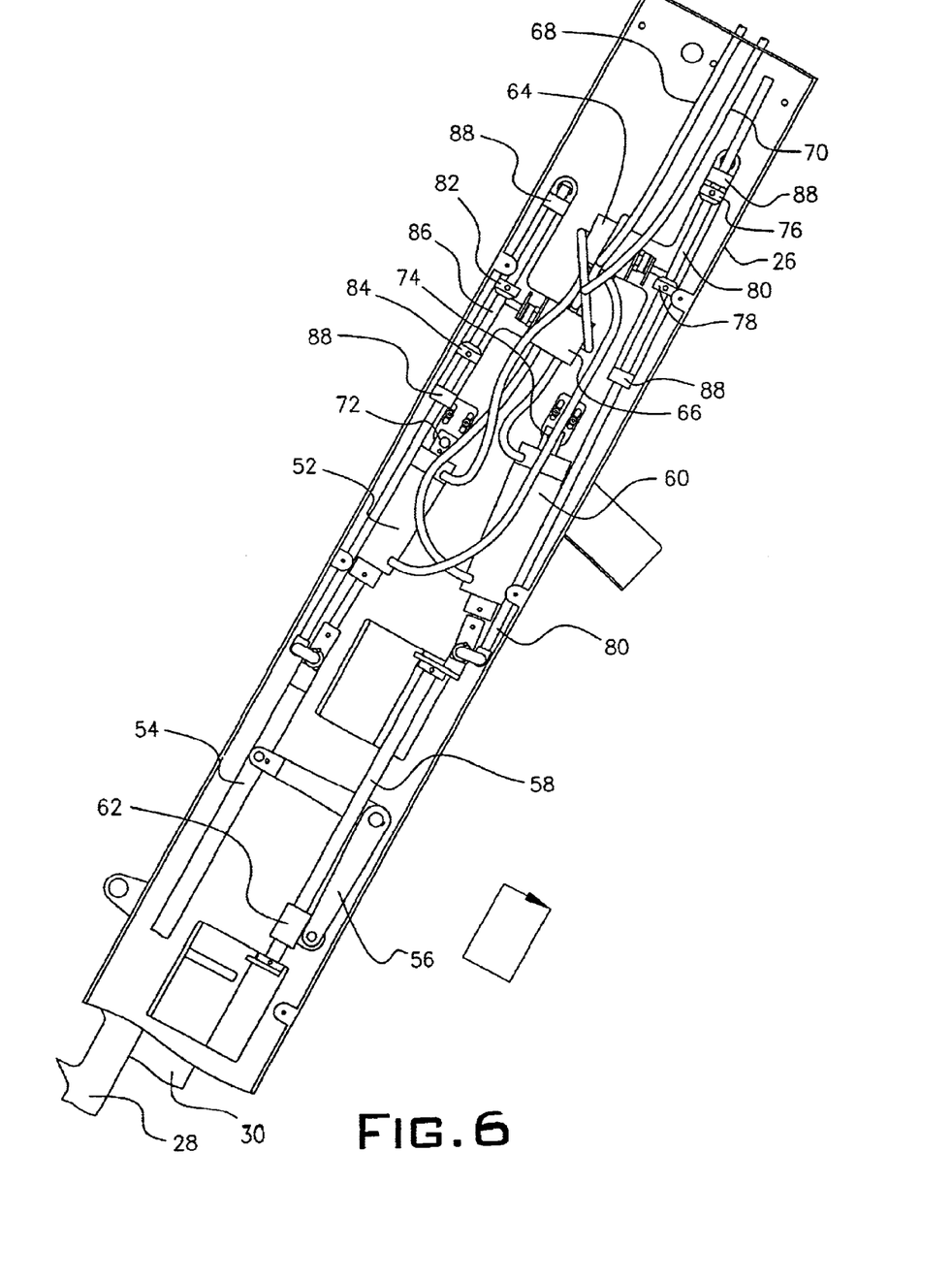
FIG. 6 is a cut-away elevational view of the assembly side frame containing the hydraulic piston driving mechanism depicting the dynamic bars moved backwardly.
Figure 7:
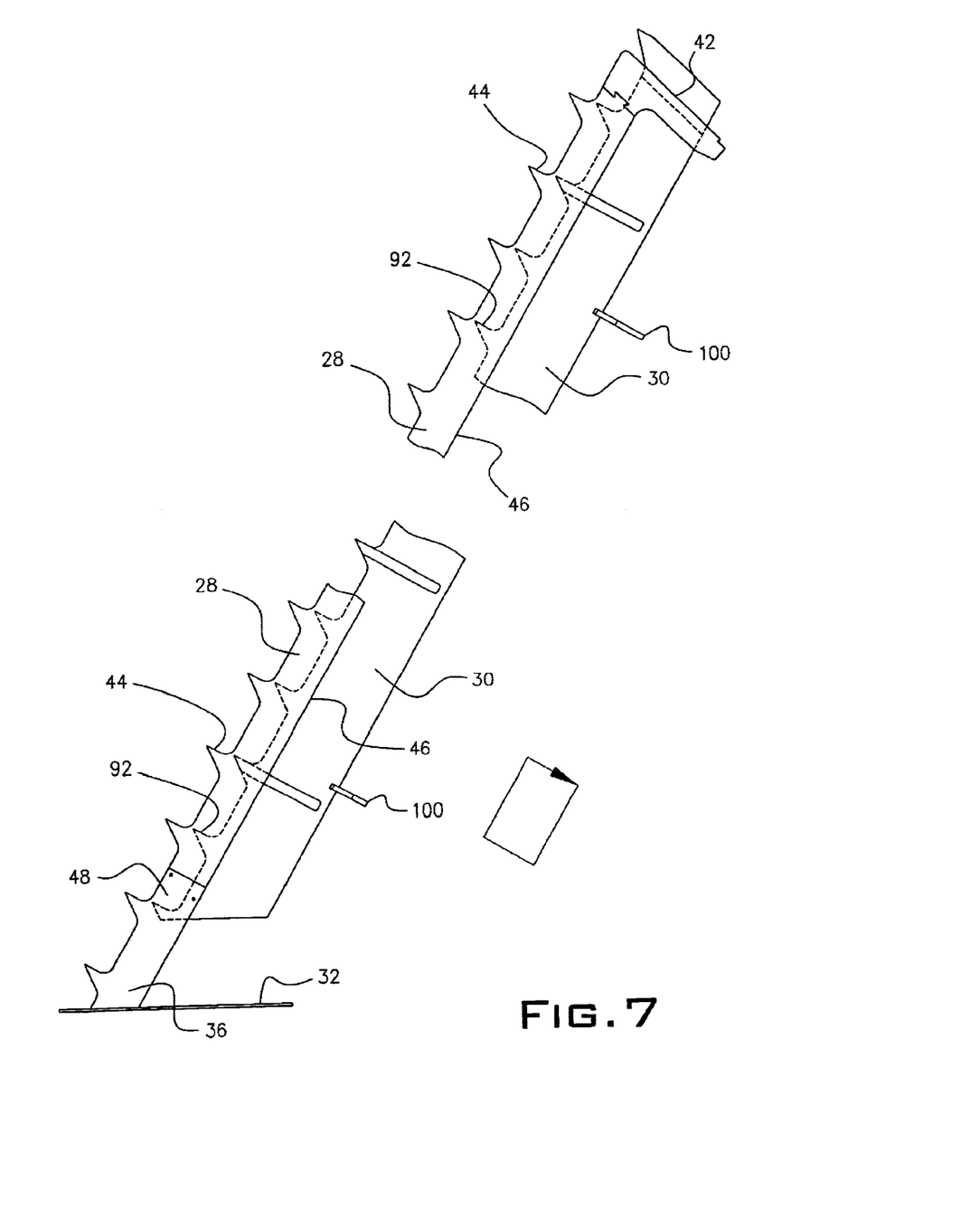
FIG. 7 is a cut-away elevational view according to FIG. 6 depicting the dynamic bars moving backwardly.
Figure 8:
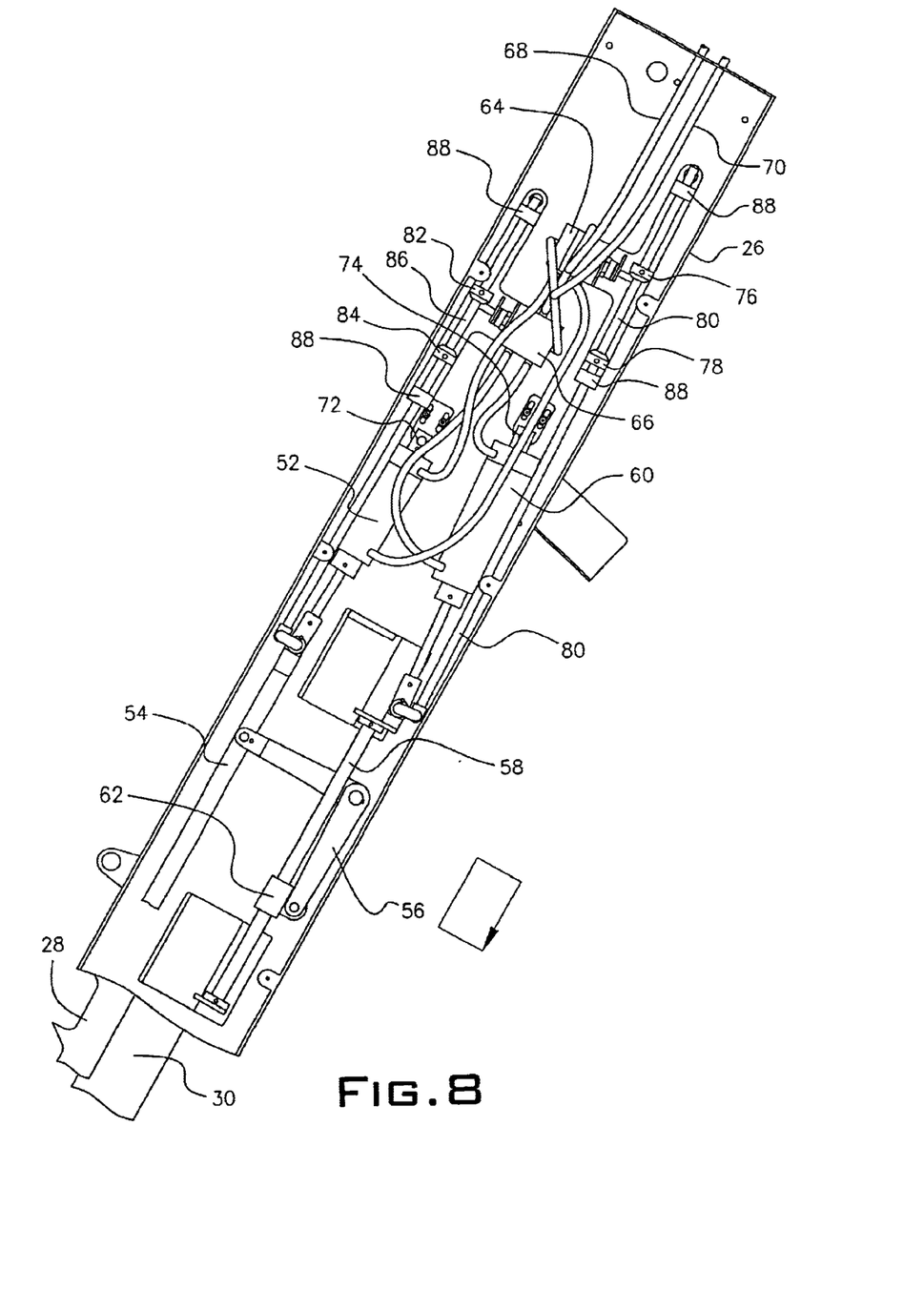
FIG. 8 is a cut-away elevational view of the assembly side frame containing the hydraulic piston driving mechanism depicting the dynamic bars moved downwardly.
Figure 9:
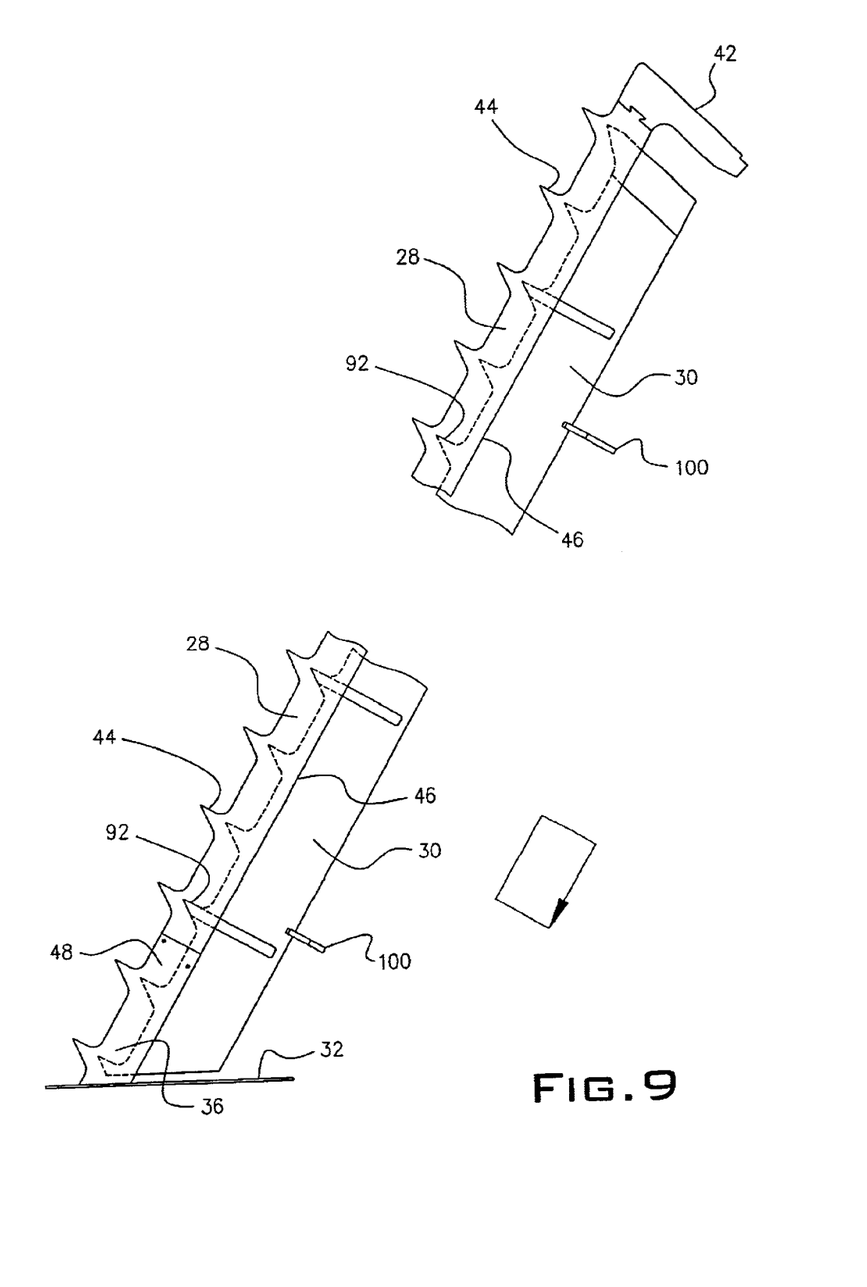
FIG. 9 is a cut-away elevational view according to FIG. 8 depicting the dynamic bars moved downwardly.

As seen in FIGS. 2 and 3, the down stroke of piston 52 moves the dynamic plate outwardly. As seen in FIG. 4 and 5, the upstroke of piston 60 moves the dynamic plate upwardly. As seen in FIGS. 6 and 7 the downward stroke of piston 52 moves the dynamic plate backwardly. As seen in FIGS. 8 and 9 the downward stroke of piston 60 moves the dynamic plate downwardly.

Figure 10:
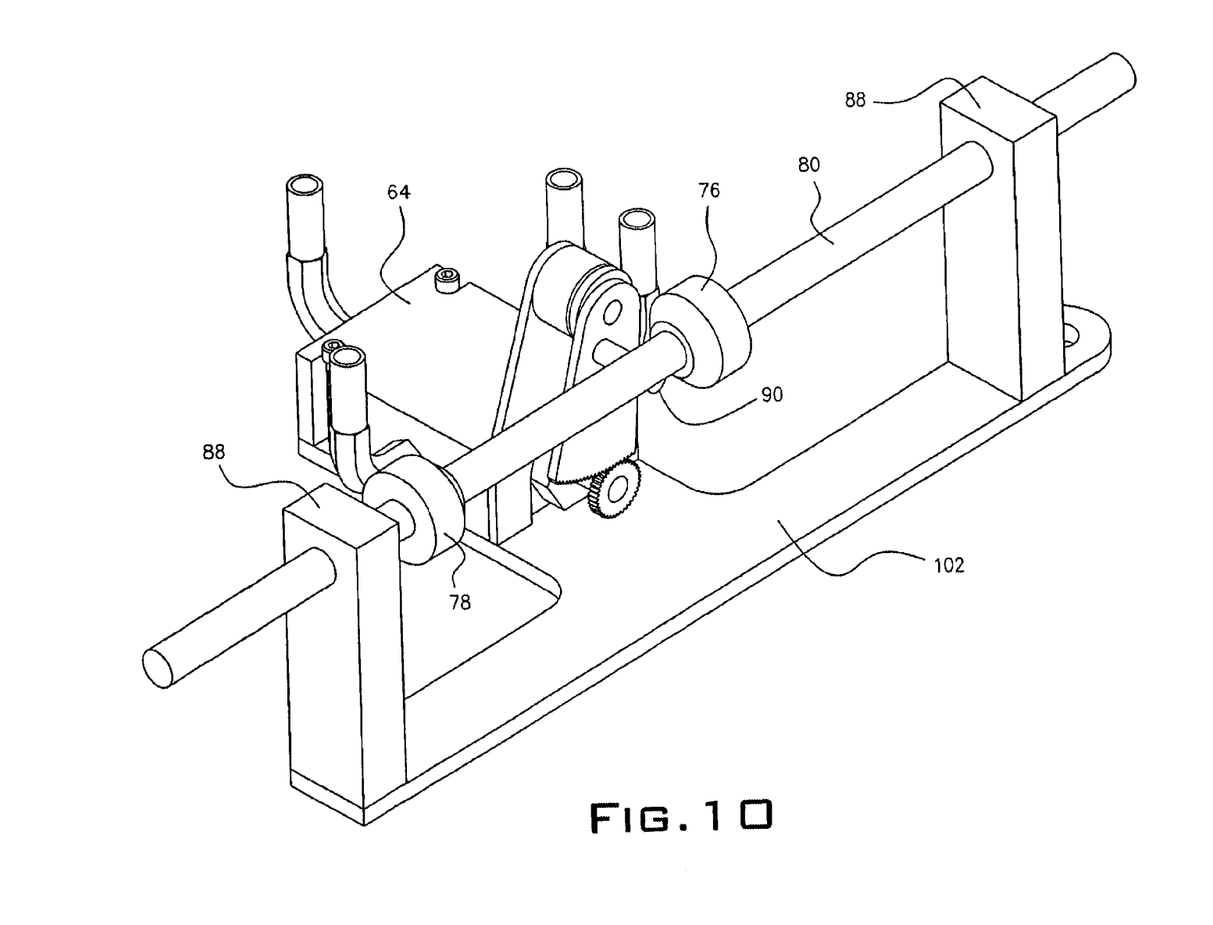
FIG. 10 is a magnified view of a valve controlling a piston in the extended position.
Figure 11:
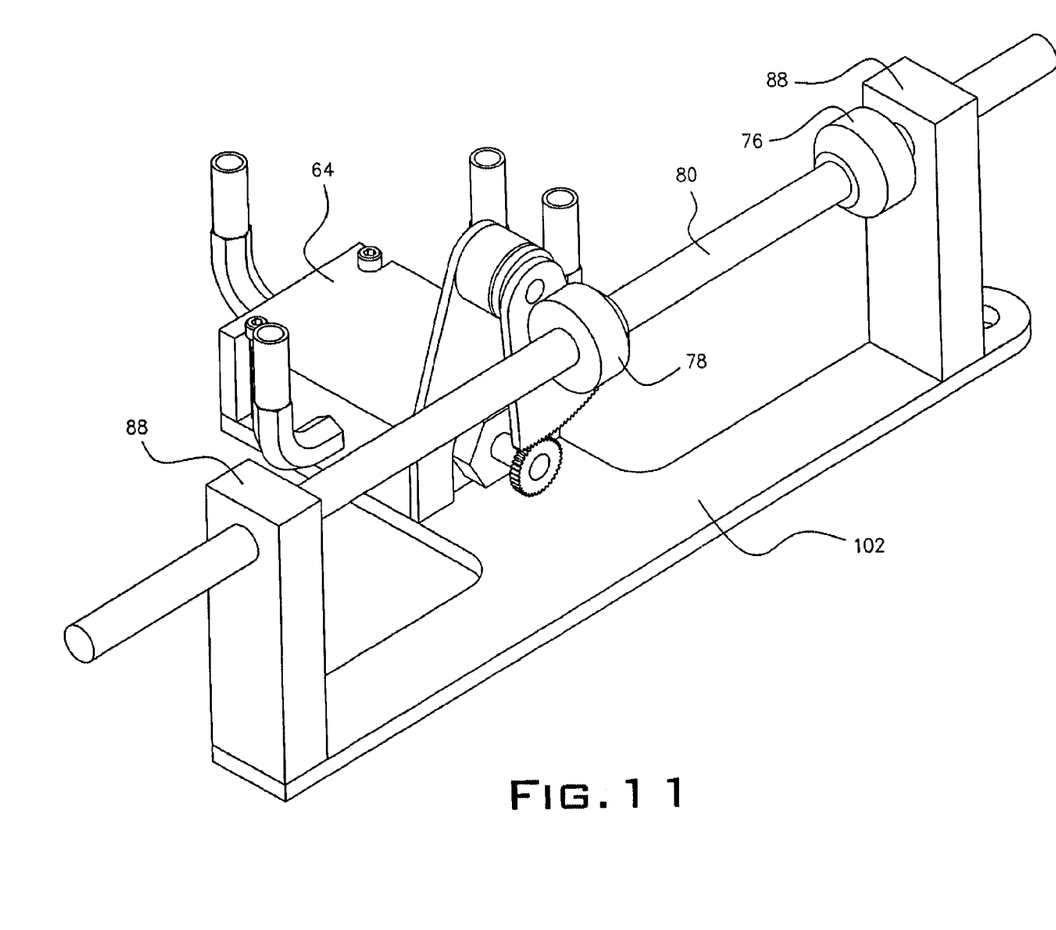
FIG. 11 is a magnified view of a valve controlling a piston in the retracted position.

As seen in FIG. 10, stop 76 engages valve rod 90 when control rod 80 reaches the maximum down stroke and as seen in FIG. 11, stop 78 engages valve rod 90 when control rod 80 reaches the maximum upstroke. Plate 102 supports the valve 64 and is attached to outer frame 26.

Figure 13:
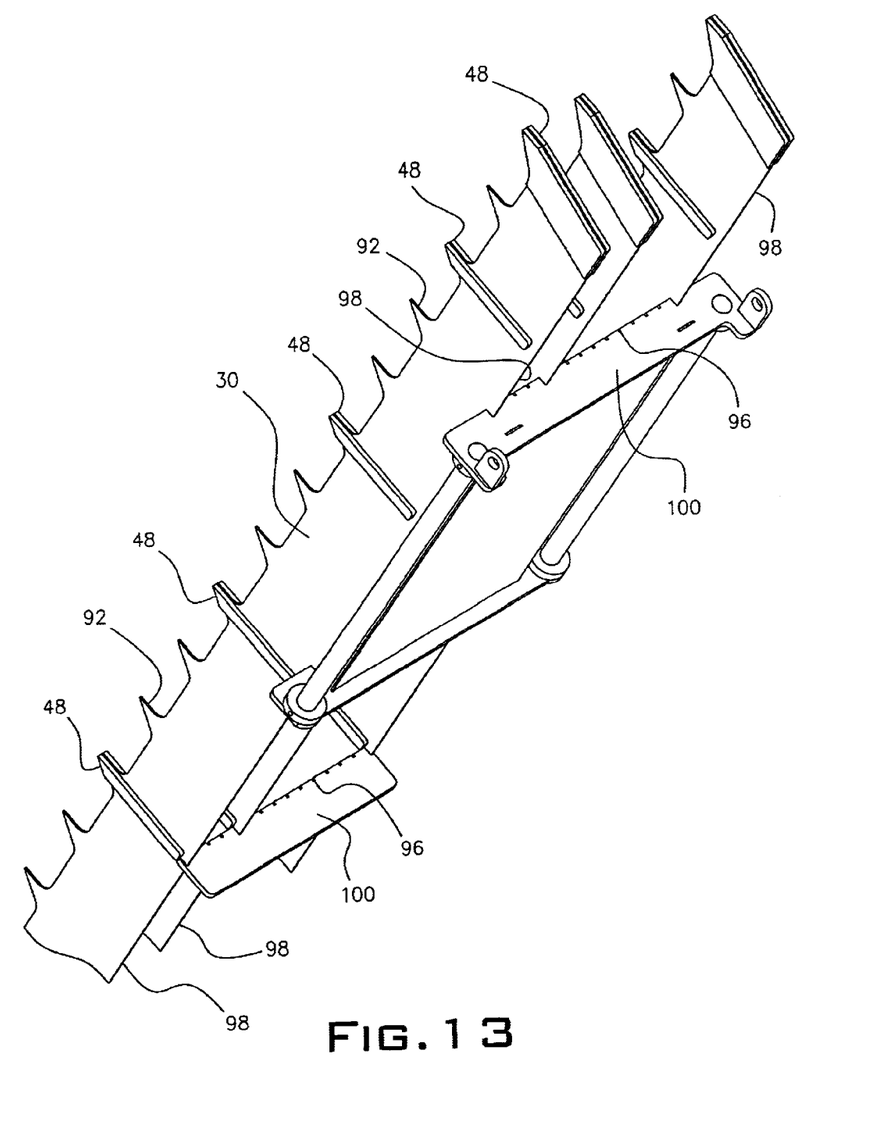
FIG. 13 is a perspective view of the dynamic bars mounted in intermediate mounting plates.

As seen in FIG. 13, all the dynamic bars 30 are mounted within grooves 96 in transverse mounting plates 100. A description of the movement of the dynamic bars is described in detail in U.S. Pat. No. 6,177,020, incorporated herein by reference.

As seen in FIG. 13, each dynamic bar 30 has multiple outwardly directed shelves 92 at a right angle to the vertical axis of each bar 30 and are used to lift solid matter 14 upwardly along the grid structure 24. Each shelf 92 is equally spaced apart from the next adjacent shelf. Multiple spacers 48 are positioned on each side surface of each dynamic bar 30 to maintain a proper relationship to the static bars 28 and act as a strengthening element for the bars 28 and 30. A back edge 98 of each dynamic bar 30 is mounted in a slot 96 in intermediate plate 100. The diameter of each spacer 48 is 2 ml to 9 ml to determine the openings in the grid structure 24. The spacers 48 also act to push solid material off static bars Referring to FIGS. 2–9, operation of the grid structure 24 will be described. FIGS. 2–3 show the home stage when the static bars 28 and dynamic bars 30 are perfectly aligned, but spaced apart by spacers 48. In this mode, solid matter 14 in the waste water stream 16 is deposited on the grid structure 24. FIGS. 4–5 show the dynamic bars 30 moving upwardly in response to an upward stroke from cylinder 60. This stroke lifts solid matter 14 from the waste water stream 16. FIGS. 6–7 show the inward movement of dynamic bars 30 so that the solid matter is deposited on shelves 44 of the static bars 28. This movement is in response to a downward stroke by cylinder 52.

FIGS. 8–9 show the downward movement of dynamic bars 30 in response to the downward stoke from cylinder 60. This results in a retreat to the home stage in FIG. 3 when cylinder 52 causes an upward stroke to move dynamic bars 30 outwardly.

Figure 14:
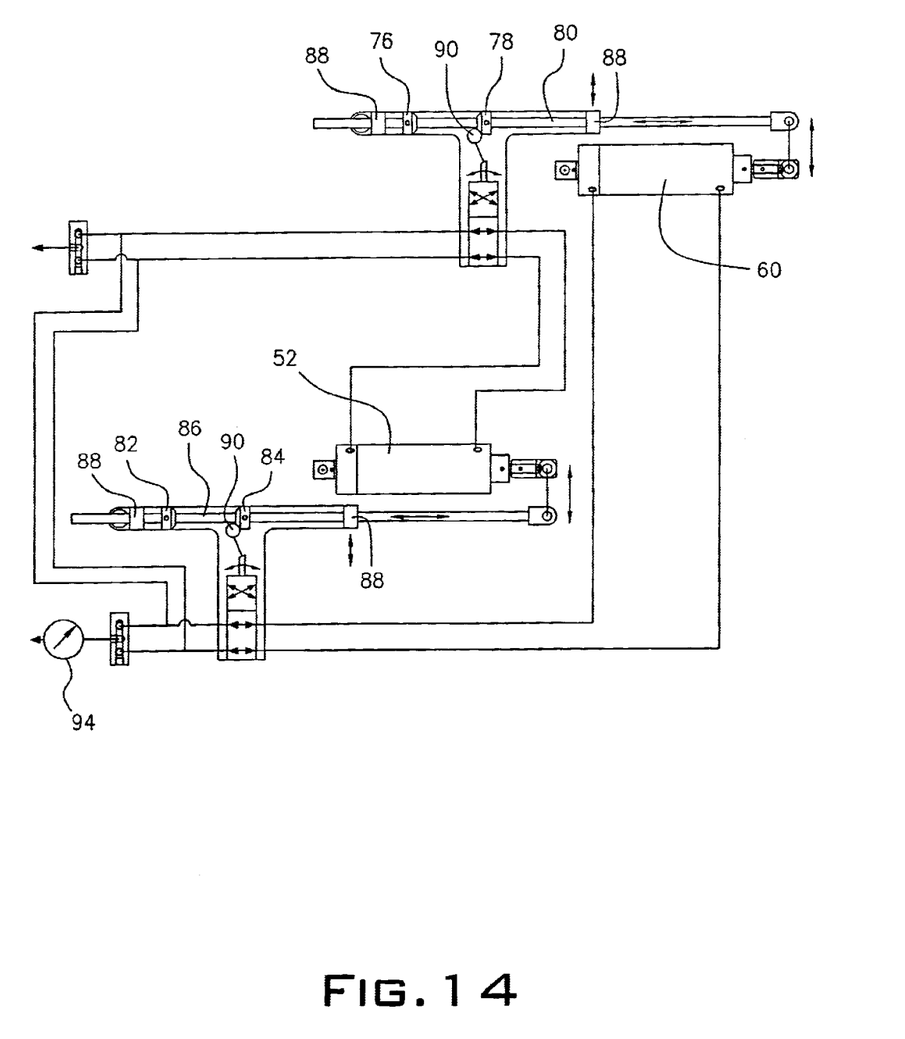
FIG. 14 is a schematic of the hydraulic system employed to move the dynamic bars.

FIG. 14 shows the oil system including pressure gauge 94 to control the pressure in hydraulic pistons 52 and 60.

The bars 28 and 30 as well as the other components of the grid structure 24 and the outer frame as well as the associated conveyor assembly 12 are made from stainless steel.

Referring back to FIG. 1, the solid matter 14 is moved upwardly along the grid structure 24 as described above until it reaches the disposal plate 38 from which it slides downwardly to standard conveyor assembly 12. The solid matter 14 is thereafter lifted upwardly to a waste repository. In this manner, solid waste 14 is removed from waste water stream 16 and the water moves through the grid structure 24 to a waste stream 20 free of solid matter. Thereafter, the waste stream 20 can be treated in accordance with standard treatment procedure.

The above description has described specific structural details embodying the invention. However, it will be within one having skill in the art to make modifications without departing from the spirit and scope of the underlying inventive concept of this stepping screen assembly. The inventive concept is not limited to the structure described, but includes such modifications and equivalents within the knowledge of one having skill in this art.

Having described the invention, what is claimed and desired to be secured by Letters Patent is:

1. A stepping screen assembly interposed in a liquid waste stream for collecting and disposing of solid matter in the waste stream, the assembly comprising:
    (a) an upwardly inclined grid structure containing multiple parallel alternating static and dynamic bars horizontally spaced apart, the bars each having multiple vertically and equally spaced apart shelves at a right angle to the vertical axis of the bar, each dynamic and static bar separated horizontally by a spacer;
    (b) an outer frame adjacent a side surface of the grid structure;
    (c) the outer frame enclosing a first and second hydraulic piston together with a means for operating the first and second hydraulic piston;
    (d) the first hydraulic piston driving a substantially vertical first control rod, the control rod driving a shaft attached to a mounting plate supporting the dynamic bars and causing the dynamic bars to move up and down substantially vertically;
    (e) the second hydraulic piston driving a substantially vertical second connecting rod to move a hinged member to move the shaft attached to the mounting plate supporting the dynamic bars and causing the dynamic bars to move forward and backwardly; and
    (f) the dynamic bar movement causing the solid matter in the liquid waste stream to be lifted upwardly on the shelves to a top most level from which the solid matter falls by gravity to a means for disposing of the solid matter.

2. The stepping screen assembly according to claim 1 wherein each dynamic bar is supported on a back edge in grooves on an edge of the mounting plate.

3. The stepping screen assembly according to claim 1 wherein each static bar is attached at a bottom end to slots in a bottom plate and at a top end to grooves in a disposal place.

4. A stepping screen assembly interposed in a liquid waste stream for collecting and disposing of solid matter in the waste stream, the assembly comprising:
    (a) an upwardly inclined grid structure containing multiple parallel alternating static and dynamic bars horizontally spaced apart, the bars each having multiple shelves equally spaced apart and at a substantially 90° angle to a vertical axis of each bar;
    (b) multiple spacers vertically spaced apart attached to each side surface of each dynamic bar;
    (c) an outer frame surrounding the grid structure, the outer frame enclosing a pair of hydraulic pistons;
    (d) the hydraulic pistons driving the dynamic bars up and down and out and in with respect to the static bars; and
    (e) the dynamic bar movement causing the solid matter in the liquid waste stream to be lifted upwardly on the shelves to a top most level from which the solid matter falls by gravity to a means for disposing of the solid matter.

5. The stepping screen assembly according to claim 4 wherein the dynamic bars are each attached to a groove in an edge of multiple mounting plates, the mounting plates moved by action of the hydraulic pistons.

6. The stepping screen assembly according to claim 4 wherein the static bars are rigidly supported in a bottom plate and a top disposal plate.

7. A process for removing solid waste from a fluid stream comprising:

(a) mounting a bottom portion of a stepping screen assembly in a liquid waste stream containing solid mater;

(b) providing in the stepping screen assembly a grid structure containing multiple parallel alternating static and dynamic bars horizontally spaced apart, the bars each having multiple vertically spaced apart shelves at a right angle to the vertical axis of the bar, each dynamic bar having multiple vertically spaced apart spacers attached to a first and second side surface;

(c) providing an outer frame adjacent a side surface of the grid structure;

(d) providing a first and second hydraulic piston mounted within the outer frame;

(e) driving a vertical rod downwardly with a stroke of the first hydraulic piston, the vertical shaft driving multiple mounting plates supporting the dynamic bars;

(f) driving the mounting plates backward or forward by the stroke of the second hydraulic piston;

(g) lifting the solid waste material from the fluid stream with the shelves as the solid waste material impacts the grid structure; and (h) dropping the solid waste material by gravity from a top portion of the grid structure to a means for disposing of the solid matter.

8. The process according to claim 7 wherein a conveyor is provided to carry the solid matter to a disposal bin.

* * * * *